(12) United States Patent
Yang et al.

(10) Patent No.: US 6,646,887 B2
(45) Date of Patent: Nov. 11, 2003

(54) REMOVABLE MECHANICAL ATTACHMENT SYSTEM FOR ELECTRONIC ASSEMBLIES

(75) Inventors: Kei-Wean C. Yang, Beaverton, OR (US); Gary W. Reed, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/154,940

(22) Filed: May 23, 2002

(65) Prior Publication Data

US 2003/0179562 A1 Sep. 25, 2003

Related U.S. Application Data

(60) Provisional application No. 60/366,357, filed on Mar. 20, 2002.

(51) Int. Cl.[7] .............................. H05K 5/00; H05K 5/04; H05K 5/06
(52) U.S. Cl. ........................ 361/759; 361/801; 361/802; 439/378; 439/371
(58) Field of Search ................................ 361/729, 732, 361/747, 756, 759, 801, 802; 174/52.2; 70/208; 403/24, 409.1; 439/378, 284, 371, 345, 674

(56) References Cited

U.S. PATENT DOCUMENTS

| | | | | |
|---|---|---|---|---|
| 3,745,512 A | * | 7/1973 | Johnson et al. | 439/599 |
| 4,842,543 A | * | 6/1989 | Davis | 439/378 |
| 5,080,461 A | * | 1/1992 | Pimpinella | 385/65 |
| 5,125,849 A | * | 6/1992 | Briggs et al. | 439/378 |
| 5,606,635 A | * | 2/1997 | Haake | 385/53 |

* cited by examiner

Primary Examiner—David Martin
Assistant Examiner—Thanh S. Phan
(74) Attorney, Agent, or Firm—William K. Bucher

(57) ABSTRACT

A removable mechanical attachment system has first and second removable attachment members with each removable attachment member having first and second links. Each link has a base and at least a first extension member extending from one side of the base. The links are secured to respective surfaces of first and second electrical sections with at least one of the extension members of the first and second links of each of the first and second removable attachment members extending past open end faces of the first and second electrical sections. The electrical sections are positioned in a proximate abutting relationship at the open end faces with the extension members extending past the open end faces of the electrical sections overlapping the other extension members of the first and second removable attachment members. A bonding material is applied to the overlapping extension members to join the extension members together.

29 Claims, 5 Drawing Sheets

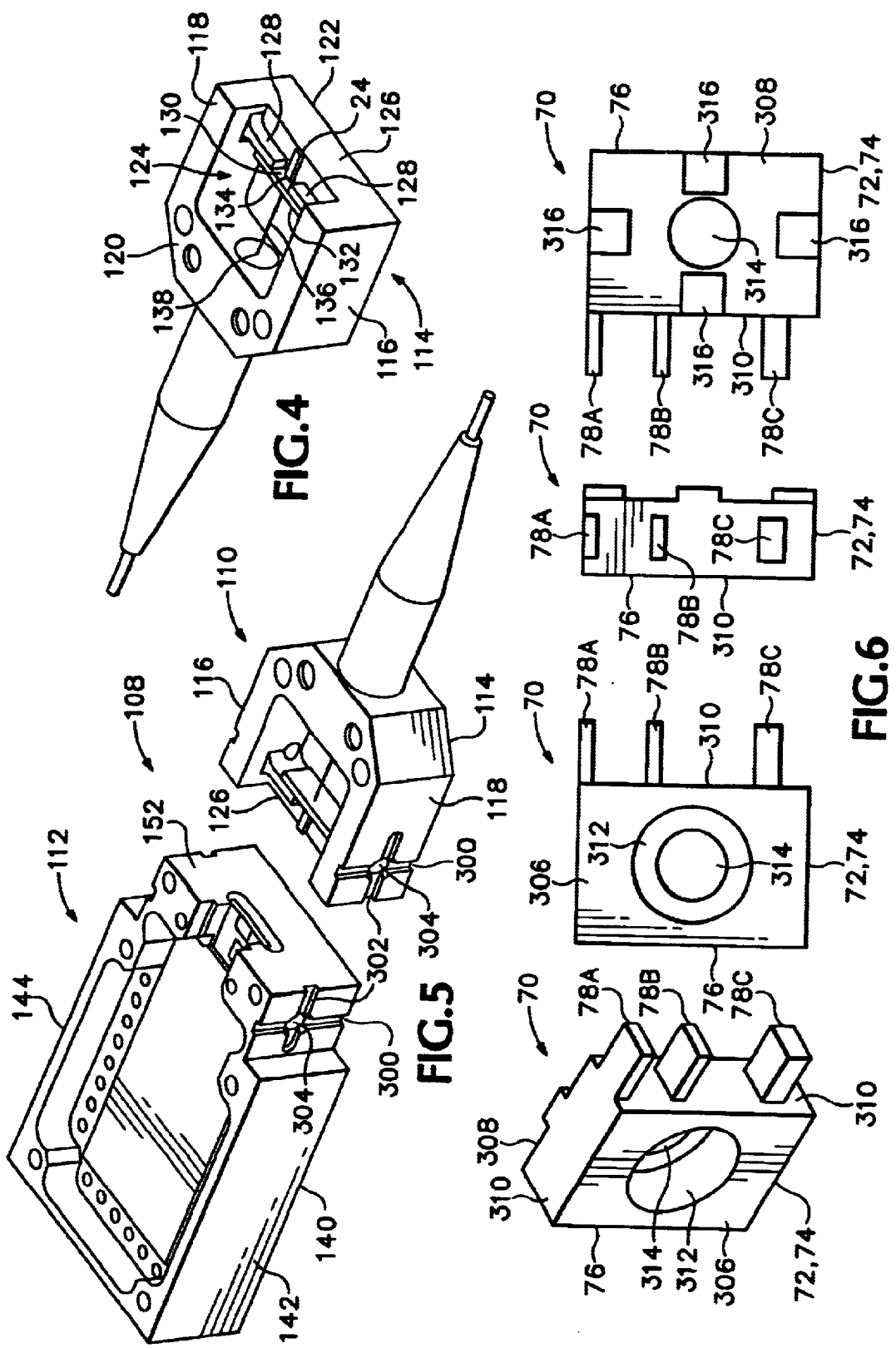

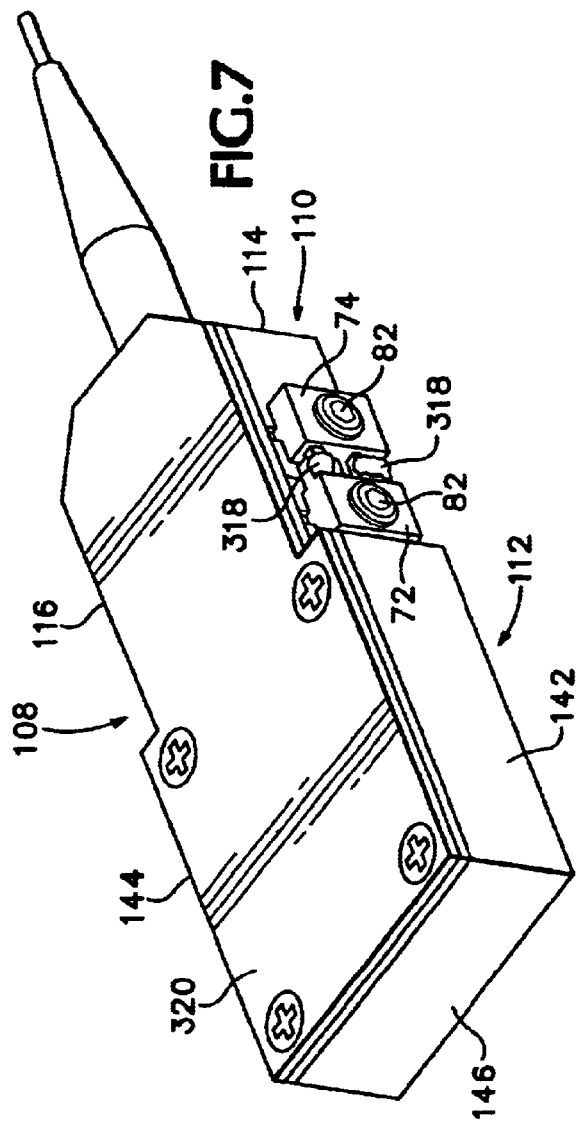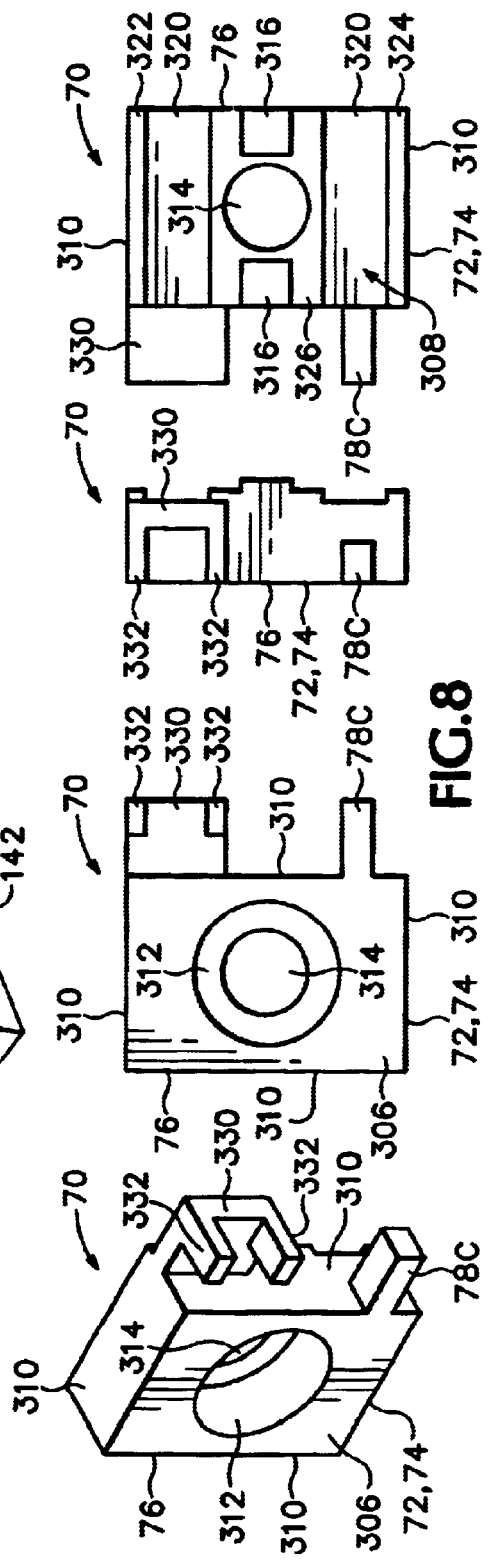

REMOVABLE MECHANICAL ATTACHMENT SYSTEM FOR ELECTRONIC ASSEMBLIES

CROSS-REFERENCE TO RELATED APPLICATION

This application claims the benefit of the U.S. Provisional Application No. 60/366,357, filed Mar. 20, 2002.

BACKGROUND OF THE INVENTION

The present invention relates generally to mechanical linking systems for electronic assemblies and more particularly to removable mechanical attachment systems for butt joined electronic assemblies and modules operating at millimeter wavelength frequencies.

Recent advancements in optical communications technology have demonstrated optical data demuxing at a speed of over 160 Gbit/sec through a single mode optical fiber. At the same time, there is a lack of corresponding progress in test and measurement instrumentation to support analyzing these fast optical pulses. Current solutions are limited by interconnect issues that limit bandwidth and signal integrity, and manufacturing issues that can substantially increase the cost of components. One commercial solution is to couple an enclosed photodetector module with a conventional enclosed sampling head using a coaxial transmission line. The coupled modules are mounted in an optical plug-in module for a sampling oscilloscope. Another solution is to buy a high-speed photodetector as the optical-to-electrical (O/E) converter and use a sampling oscilloscope to capture the signal. This approach seems more beneficial for users because, in addition to having to spend less money, they can also maintain the electrical input to the scope for other testing needs. The inconvenience to users is that the screen is no longer calibrated for accurate power measurements. However, this inconvenience can be overcome by purchasing a separate power meter and perform a calibration manually. Users are faced with the choice of spending more money for the added power level calibration feature of an optical plug-in module or save $10 to 15 thousand dollars by buying a photodetector separately such that both electrical inputs and optical inputs can be measured with the same investment. The latter choice also provides users with a power meter which can be used elsewhere as well.

A common weakness for the above two solutions is that they both need electrical interconnections to connect the photodetector output to the sampler input. Because of the high frequencies involved, the connectors are quite expensive. Moreover, aside from introducing additional costs to the system, these components also introduce unwanted impedance mismatching that produce signal reflections. These signal reflections result in waveform distortion as a function of bit pattern when measuring fast repetitive signals, such as the RZ 40 Gb/Sec optical data.

A solution to these problems is to combine the detector and sampler semiconductor devices together to form a fully integrated photodetector-sampler IC design. This would eliminate all of the interconnecting hardware between the photodiode and sampler. While a fully integrated photodetector-sampler design (FIPS) sounds good, it runs into practical problems during implementation. Generally, test equipment manufactures are not vertically integrated companies that have the processing technology or the equipment to produce FIPS designs. In addition, high speed photodetector manufacturers generally specialize in producing optical components, such as O/E and E/O converters, but not electrical components, such as electrical samplers. Conversely, electrical component manufactures do not manufacture optical components. To produce the FIPS design would require capital investment and technology development by optical or electrical component manufactures or the test and measurement equipment manufacturer.

Another issue with the FIPS design is yield loss of the final assembly if either of the optical detector or sampler sections develop problems. The photodiode performance cannot be accurately characterized until permanently mounted on or within a carrier or housing, an optical fiber aligned to the photodiode, and electrically coupled to the sampler section. If the output of the competed FIPS device does not meet design specifications, it is difficult to determine if the problem has to do with the fiber alignment, photonic and impulse responses of the diode, polarization sensitivity and the like in the optical detector section or signal gain, sensitivity and the like in the sampler section. Even if the performance problem can be identified to one of the sections, replacing the defective section may lead to damage of the other section.

Another problem with the FIPS design is negotiating refunds on defective parts. Since different manufacturers make the components for the optical and sampler sections and one or the other or a system integrator, such as the test and measurement manufacturer, performs the final integration, determining the cause of the failed part or parts in the sections can be a source of conflict. For example, the problem may be determined within the photodetector module, say a lower than spec photo response. The problem could have been caused by the photodiode die being damaged during the FIPS processing; the optical fiber being misaligned from the integrator assembly process; the optical fiber end surface polishing being flawed; the fiber/detector IC junction having foreign contaminations not readily visible to the eye; the wire bond from the detector IC to the sampler IC having excessive inductance introduced by improper wirebonding; the wirebonder damaging the detector IC by improper bonding control, such as excess bond head ultrasonic energy or pressure, and the like. The photodetector IC manufacturer may be reluctant to refund the cost of the multi-thousand dollars detector IC where the defect is caused by a defective assembly process.

What is needed is an electronic assembly and module design that overcomes the shortcomings of the FIPS and the coaxial interconnect designs. The electronic assembly and module design should allow independent testing and verification of separate sections of the assembly prior to final assembly or integration. The electronic assembly or module should allow for easy assembly and alignment of the separate device sections down to the micron level. Further, there is needed for a removable mechanical securing system for joining the separate sections together as a single assembly or module that allows easy disassembly of the joined sections.

SUMMARY OF THE INVENTION

Accordingly, the present invention is to a removable mechanical attachment system for joining at least first and second electrical sections or housings as a single electronic assembly or module. The removable mechanical attachment system has first and second removable attachment members with each removable attachment member having first and second links. Each link has a base having front, back and sides with a bore extending through the base from the front to the back and a least a first extension member extending from one of the sides of the base. The links of the first removable attachment member are secured to respective first surfaces of the electrical sections or housings and links of the second removable attachment member are secured to respective second surface of the electrical sections or housings by securing members. The links of the first and second removable attachment members are disposed adjacent to open end faces of the electrical sections or housing. At least one of the extension members of the links of each of the first and second removable attachment members extends past one of the open end faces of the electrical sections or housings. The electrical sections or housings are positioned in a proximate abutting relationship at the open end faces with the extension members extending past the open end faces of the electrical sections or housings overlapping the other extension members of the first and second removable attachment members. A bonding material is applied to the overlapping extension members to join the extension members together.

The removable mechanical attachment system is preferably implemented with a plurality of extension member extending from the base of each of the links. At least one of the plurality of extension members of the first and second links of each of the first and second removable attachment members extends past one of the open end faces of the electrical sections or housing. Each of the links may also be implemented with a first extension member having tangs extending in a perpendicular direction from the extension member toward the front of the base. The second extension member of each of the first and second links of the first and second removable attachment members extend between the tines on the first extension member of each of the first and second links of the first and second removable attachment members. In the preferred embodiment, the extension members of the links extend past the open end faces of the electrical sections or housings.

Each link preferably has at least a first pedestal foot formed on the back of the base that engages a channel formed in each surfaces of the electrical sections or housings. In the preferred embodiment, each link has orthogonally disposed pedestal feet formed on the back of the base that engage orthogonally formed channels formed in each of the first and second surfaces of the first and second housings. Threaded apertures are formed at the intersection of the orthogonal channels with the threaded apertures receiving treaded screws that secure the links to the electrical sections or housings.

The extension members may be plated with a tin-lead alloy for receiving solder that is used as the bonding material. The bonding material may also include an adhesive, such a epoxy or the like. The bonding material may also be a strong adhesion low melting temperature metal, such as indium.

The objects, advantages and novel features of the present invention are apparent from the following detailed description when read in conjunction with appended claims and attached drawings.

BRIEF DESCRIPTION OF THE DRAWINGS

FIG. 4 is a perspective view of the opto-electrical module of the butt joined electronic module using the removable mechanical attachment system according to the present invention.

FIG. 5 is a perspective view of the housings of the electronic module illustrating the housing attachment structure for the removable mechanical attachment system according to the present invention.

FIG. 6 illustrates various views of one embodiment of the links of the removable attachment members used in the removable mechanical attachment system according to the present invention.

FIG. 7 is a perspective view of the joined housings using the removable mechanical attachment system according to the present invention.

FIG. 8 illustrates various views of a further embodiment of the links of the removable attachment members used in the removable mechanical attachment system according to the present invention.

DETAILED DESCRIPTION OF THE PREFERRED EMBODIMENT

Figure 1:
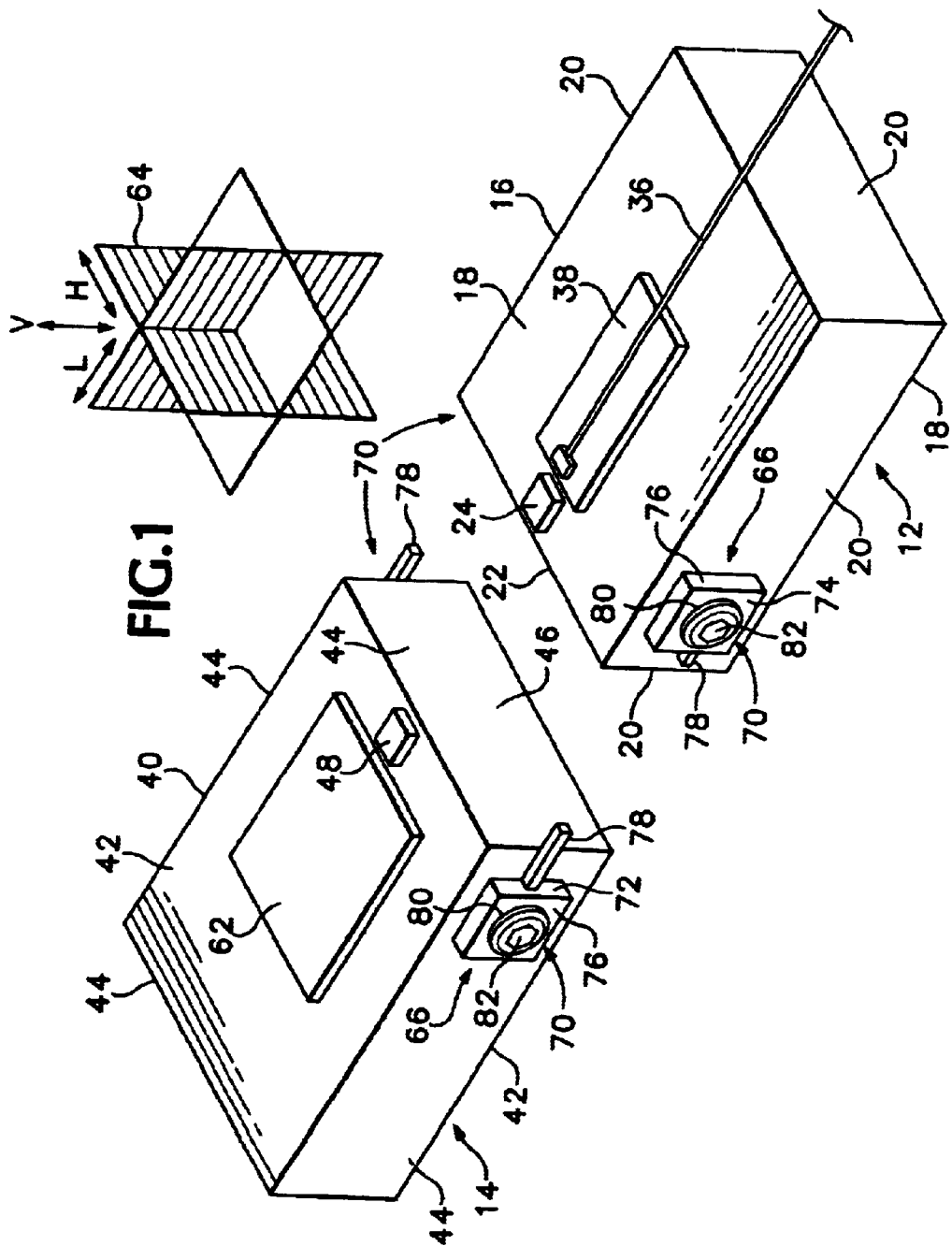
FIG. 1 is a perspective view illustrating two electrical sections to be joined as a single electronic assembly using the removable mechanical attachment system according to the present invention.
Figure 2:
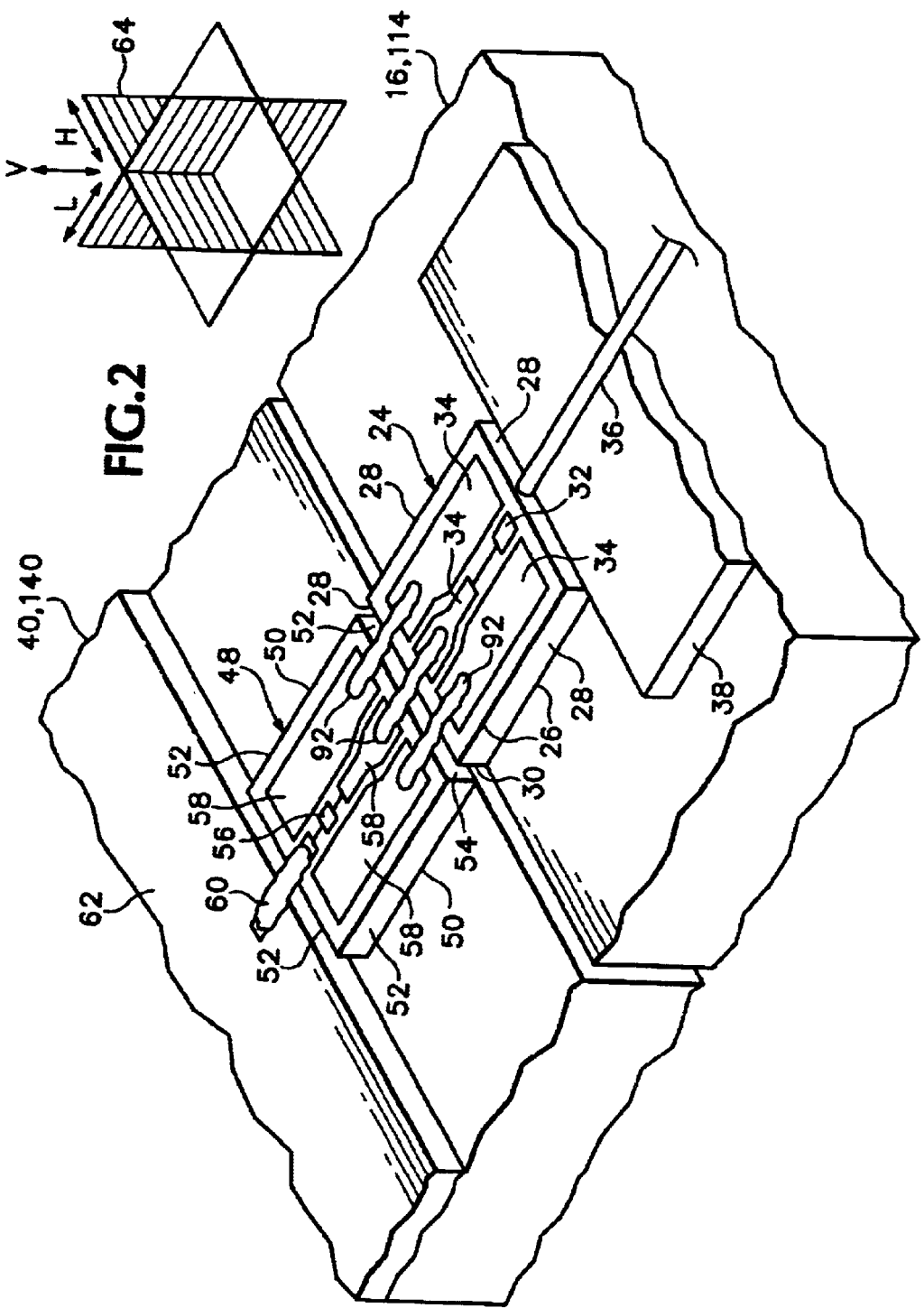
FIG. 2 is a detailed perspective view of the joined optical and electrical elements of the butt joined electronic assembly.

The removable mechanical attachment system of the present invention mechanically joins separate sections or housing of butt joined opto-electronic assemblies and modules. The removable mechanical attachment system allows three dimensional positioning freedom of the sections and modules to align electronic elements on the sections and modules with micrometer accuracy. FIG. 1 show a perspective view of a butt joined opto-electronic assembly 10 having an opto-electrical section 12 and an electrical section 14. The opto-electrical section has a carrier 16 having opposing horizontal surfaces 18 and side surfaces 20 with one of the side surfaces defining an open end face 22. The carrier 16 is made of any suitable solid material that provides a rigid base for receiving optical or electrical components, substrates and the like. Such materials include, but not limited to, metals such as brass or the like, glass, plastic and the like. An opto-electrical element 24 is positioned on the carrier 16 and secured using an adhesive, such as a conductive or non-conductive epoxy. The opto-electrical element 24 (as best shown in FIG. 2) has opposing horizontal surfaces 26 and side surfaces 28 with one of the side surfaces defining an end face 30. An opto-electrical device 32, such as an optical-to-electrical converter implemented as a semiconductor photodiode, a semiconductor laser, an optical modulator or the like, is formed on one of the horizontal surfaces 26 of the opto-electrical element 24. A coplanar transmission structure 34 is formed on one of the horizontal surfaces 26 and has one end electrically coupled to the opto-electrical device 32. The other end of the coplanar transmission structure 34 is disposed adjacent to the end face 30 of the opto-electrical element 24. An optical waveguide 36, such as an optical fiber, may be mounted on a substrate 38 as is described in U.S. Pat. No. 4,702,547, titled "Method for Attaching an Optical Fiber to a Substrate to form an Optical Fiber Package". The optical waveguide 36 is optically aligned with the opto-electrical device 32 for coupling an optical signal to or from the opto-electrical device 32. Alternately, the optical waveguide 36 may be formed as part of the substrate 38 and optically aligned with the opto-electrical device 32. The optical fiber is then optically aligned with the substrate optical waveguide.

The electrical section 14 has a carrier 40 of similar design to carrier 16 of the opto-electronic section 12 with the carrier 40 having opposing horizontal surfaces 42 and side surfaces 44 with one of the side surfaces defining an open end face 46. The carrier 40 is preferably made of the same material as the carrier 16 for the opto-electrical section 12. An electrical element 48 is positioned on the carrier 40 and secured using an adhesive, such as a conductive or non-conductive epoxy. The electrical element (as best shown in FIG. 2) has opposing horizontal surfaces 50 and side surfaces 52 with one of the side surfaces defining an end face 54. The electrical element 48 is preferably formed of a semiconductor material and has an electrical device 56, such as a sampling diode, laser driver, amplifier or the like, formed on one of the horizontal surfaces 50. A coplanar transmission structure 58, matching the coplanar transmission structure 34 of the opto-electrical element 24, is formed on one of the horizontal surfaces 50 and has one end electrically coupled to the electrical device 56. The other end of the coplanar transmission structure 58 is disposed adjacent to the end face 54 of the electrical element 48. The electrical element 48 is electrically coupled via an electrical conductor 60, such as bond wires, gold foil and the like, to a substrate 62 mounted on the carrier 14 having additional electronic circuitry formed thereon.

The carriers 16 and 40 of the opto-electrical and electrical sections 12 and 14 are linearly and rotationally positionable relative to each other in three mutually perpendicular planes as represented by the mutually orthogonal planes 64. The sections 12 and 14 are moveable up-and-down in the vertical direction, side-to-side in the horizontal direction and in-and-out in the lateral direction. The carriers 16 and 40 are position in an alignment mount with at least one of the carriers being linearly and rotationally moveable in the three mutually perpendicular directions relative to the other carrier. The carriers 16 and 40 are positioned to align the matched coplanar transmission structures 34 and 58 in a proximate abutting relationship. The lateral separation of the matching coplanar transmission structures 34 and 58 is in the sub-millimeter range with the preferred lateral separations being as small as possible. The matched coplanar transmission structures 34 and 58 are aligned such that the end faces of the opto-electronic and electrical elements 30 and 48 are parallel to each other and the coplanar transmission structures 34 and 58 lay in the same plane. Once the matched coplanar transmission structures 34 and 58 are aligned in the abutting relationship, the carriers 16 and 40 are joined together by a removable mechanical attachment system 66. The matched coplanar transmission structures 34 and 58 are then electrically coupled together using substantially flat electrical conductors 92, such as wedge bonded gold ribbon wire, bond wires or the like.

The removable mechanical attachment system 66 is mounted on the carriers 16 and 40 for securing the carriers together as a single assembly. The removable mechanical attachment system 66 preferably has two sets of removable attachment members 70 that are mounted on the opposing sidewalls 20 and 44 of the carriers 16 and 40 adjacent to their open end faces 22 and 46. Each attachment member 70 have respective first and second links 72 and 74 with each link having a base 76 and an extension member 78. The links 72 and 74 are preferably made of the same material as the carriers 16 and 40, such brass, steel or the like. Each base 72 has a bore 80 formed there through that accepts a threaded screw 82. Each screw 82 is received in a threaded aperture (not shown) formed in the sidewalls 20 and 44 of the carriers 16 and 40 and tightened to secure the links 72 and 74 to their respective carriers 16 and 40. At least one of the extension members 78 of the first and second links 72 and 74 extends past the open end face 22, 46 of its carrier. The other extension member 78 extends outward from the base 76 toward the open end face 22, 46 of its carrier. The other extension member 78 may also extend past the open end face of its carrier. As the two carriers 16 and 40 are positioned together to align the matched coplanar transmission structures 34, 58, the extension members 78 overlap each other. Once the coplanar transmission structures 34, 58 are aligned, the extension members 78 are secured together to mechanically join the carriers 16 and 40 together as one assembly. Preferably, the extension members 78 are secured together using a 60/40 tin-lead solder. Alternately, an adhesive, such as an epoxy, UV cured epoxy or a low melting temperature metal with strong adhesion like indium, can be used to secure the extension members together. One advantage of using the removable mechanical attachment system 66 is the ability to disassemble the opto-electronic assembly 10 to replace a defective section 12, 14 of the assembly if one of the sections fails. The electrical connectors 92 are removed from the coplanar transmission structures 34 and 58. All that is needed to disassemble the opto-electronic assembly 10 is to remove the screws 82 securing the links 72 and 74 to the carriers 14 and 40. This type of disassembly and replacement of defective components is substantially faster and safer than attempting to replace opto-electrical and electrical elements integrated onto a single substrate.

Figure 3:
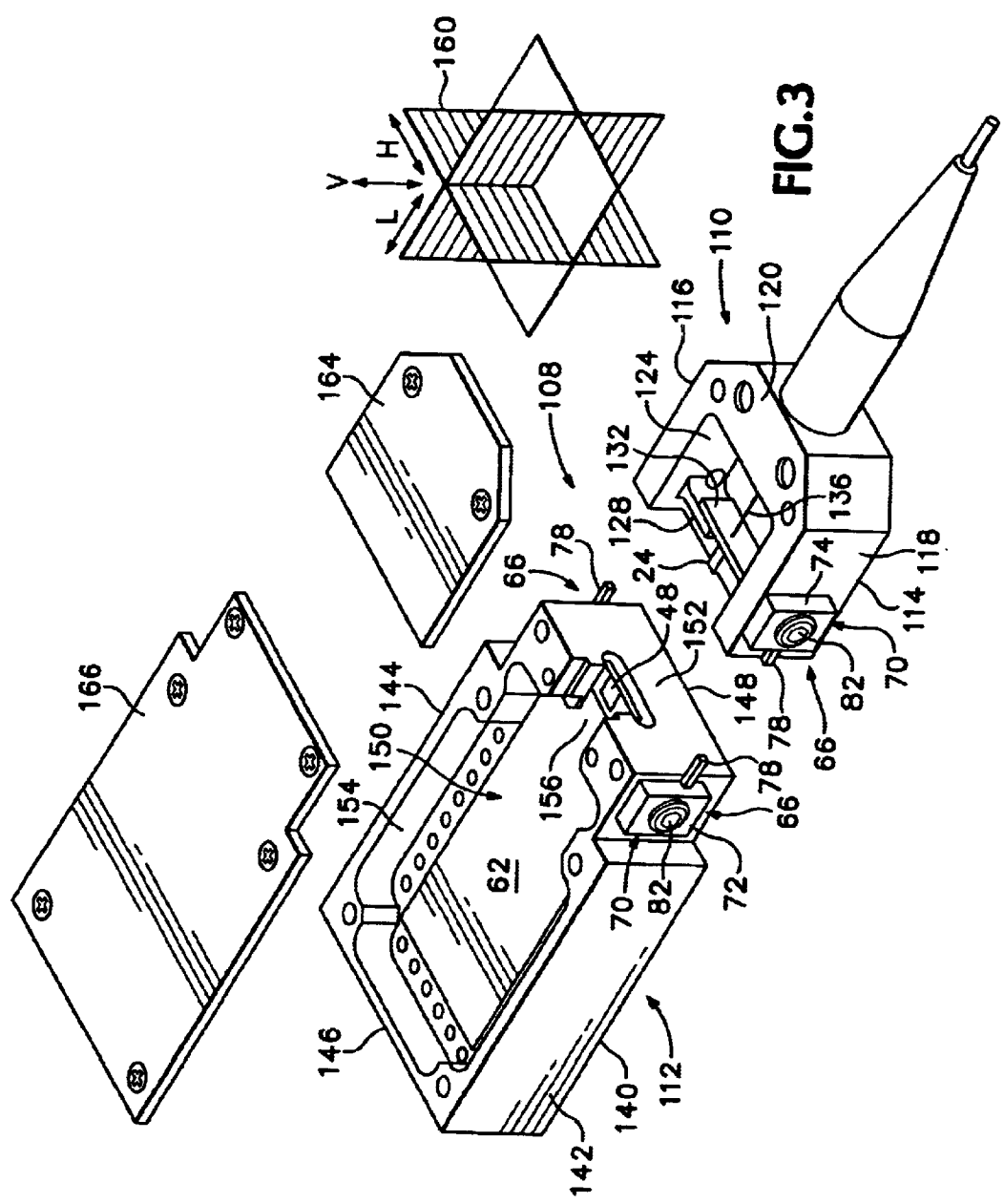
FIG. 3 is a perspective view illustrating two housings to be joined as a single electronic module using the removable mechanical attachment system according to the present invention.

Referring to FIG. 3, there is shown a perspective view of a butt joined opto-electronic module 108 using the removable mechanical attachment system 66 of the present invention. The butt joined opto-electronic module 108 has an opto-electrical section or module 110 and an electrical section or module 112. The opto-electrical module 110 has a housing 114 having sidewalls 116 and 118 and end walls 120 and 122 forming a cavity 124 within the housing 114 as shown in the perspective view of the opto-electrical housing 114 in FIG. 4. The housing 114 is preferably made of metal, such as brass or the like. Alternately, the housing may be made of solid materials, such as plastic, glass or the like. The cavity 124 is bounded on three sides by the sidewalls 116 and 118 and one of the end walls 120. The cavity 124 intersects the other end wall 122 defining an open end face 126 on the housing 114. Opposing support members 128 extend part way into the cavity 124 from the sidewalls 116 and 118 forming a gap 130 there between that supports an optical waveguide alignment member 132. The alignment member 132 had an aperture 134 formed therein that receives an optical waveguide 136 in the form of an optical fiber. The optical fiber 136 extends through an aperture 138 formed in the bounding end wall 122 of the cavity 124. The optical fiber 136 is optically aligned with the opto-electrical device 32 formed on the opto-electrical element 24 that is positioned in the cavity 124. The opto-electrical element 24 has the same structure and elements as previously described with the opto-electrical element 24 having the coplanar transmission structure 34 formed on one of the horizontal surfaces 26 of the opto-electrical element 24. Once the optical fiber 136 is aligned with the opto-electrical device 32, the alignment member 132 is secured to the support members 128. As previously stated, the optical waveguide 136 may be formed as part of a substrate 38 that is aligned with the opto-electrical device 32. The optical fiber is then optically aligned with the substrate optical waveguide 136.

The electrical module 112 has a housing 140 having sidewalls 142 and 144 and end walls 146 and 148 forming a cavity 150 within the housing 140. The housing 140 is preferably made of metal, such as brass or the like. Alternately, the housing 140 may be made of solid materials, such as plastic, glass or the like The cavity 150 is bounded on three sides by the sidewalls 142 and 144 and one of the end walls 146. The cavity 150 intersects the other end wall 148 defining an open end face 152 on the housing 140. In the preferred embodiment, the cavity 150 transitions from a larger cavity area 154 to a smaller cavity area 156 that intersects the open end face 152 of the housing 140. The transition allows the joining of the opto-electrical module 110 to the electrical module 112. The electrical element 48 is positioned in the smaller cavity area 156 adjacent to the open end face 152 of the housing 140. The electrical element 48 has the same structure and elements as previously described with the electrical device 56 and coplanar transmission structure 58 formed on one of the horizontal surfaces 50 of the electrical element 48. A substantially flat electrical conductor 60 couples the sampled electrical signal from the sampling diode or diodes to additional circuitry formed on the adjacent substrate 62. Such circuitry may include amplifiers, summing circuits and the like.

The housings 114 and 140 of the opto-electrical and electrical modules 110 and 112 are linearly and rotationally positionable relative to each other in three mutually perpendicular planes as represented by the mutually orthogonal planes 160. The modules 110 and 112 are moveable up-and-down in the vertical direction, side-to-side in the horizontal direction and in-and-out in the lateral direction. The modules 110 and 112 are joined together by the removable mechanical attachment system 66. The two sets of removable attachment members 70 are mounted on the exterior of the sidewalls 118, 140 and 116 and 144 of the housings 114 and 140. The two sets of attachment member links 72, 74 are mounted to the sidewalls 118, 140 and 116 and 144 adjacent to the open end faces 126 and 152 of the respective housings 114 and 140 with threaded screws 82. At least one of the extension members 78 of each of the link sets 72, 74 extends from the base 76 past the open end face 126, 152 of its housing 114 and 140. The other extension member 78 extends outward from the base 76 toward the open end face 126, 152 of its housing 114, 140. The other extension member may also extend past the open end face of its housing. As the two housings 114 and 140 are positioned together to align the matched coplanar transmission structures 34 and 58, the extension members 78 overlap each other. Once the coplanar transmission structures 34 and 58 are aligned, the extension members 78 are secured together to mechanically join the carriers together as one assembly.

Referring to FIG. 5, there is shown a perspective view of the housings 114, 140 of the opto-electronic module 108 illustrating in greater detail the removable mechanical attachment system 66. Like elements from previous drawing figures are labeled the same. Orthogonal channels 300, 302 are preferably formed in the sidewalls 116, 118, 142,144 of each of the housings 114, 140 adjacent to the respective open end faces 126, 152 with the horizontal channels 302 extending to the open end faces. A threaded aperture 304 is formed at the intersection of the orthogonal channels 300, 302. Alternately, either a single horizontal channel 302 or a single vertical channel 300 may be formed in the sidewalls 116, 118, 142,144. The threaded aperture 304 need not intersect the vertical or horizontal channels 300 and 302. FIG. 6 illustrates various views of one embodiment of the links 72, 74 of the removable attachment members 70 that are secured to the sidewall 116, 118, 142, 144. Each link 72, 74 has a base 76 having a front 306, a back 308 and sides 310 with extension members 78A, 78B, 78C extending from one of the sides 310 of the base 76. The extension members 78A, 78b and 78C may be plated with a layer of tin-lead to aid in soldering the extension members together. Two extension member 78A, 78B are closer together than a third member 78C with the closely spaced extension members 78A, 78B being thinner than the third extension member 78C. The base 76 has two coaxially aligned bores 312, 314 formed therein with the first bore 312 extending into the base 76 from the front 306 and having a larger diameter than the second bore 314 that extends through the base 76 to the back 308. The larger sized bore 312 receives the head of the threaded cap screw 82 with the shank of the screw extends through the second bore 314. The threads of the screw 82 engage the threaded aperture 304 in one of the sidewalls 116, 118, 142, 144 of the housings 114, 140. The treaded cap screw 82 is tightened onto the link 72, 74 to secure the link onto the housing. The back 308 of the base 76 has pedestal feet 316 extending toward the second bore 314 in the base. Each of the pedestal feet 316 bisects one of the sides 310 of the base 76. Two of the pedestal feet 316 engage one of the horizontal channels 302 formed in the sidewalls 116, 118, 142, 144 of the housings 114, 140 and two of the pedestal feet 316 engage the associated vertical channel 300 formed in the sidewalls 116, 118, 142, 144 of the housings 114, 140. The depth of the pedestal feet 316 may be greater than the depth of the channels 300, 302 to prevent the total surface of the back 308 of the base 76 from touching the sidewalls 116, 118, 142, 144 of the housings 114, 140. This prevents the links 72, 74 from transferring excessive heat to the housing 114, 140 during the soldering of the extension members 78A, 78B, 78C. The positioning of the extension members 78A, 78B, 78C on the side 310 of the base 76 allows one link design to be used on both housings 114, 140. For example, the link 72 on the electrical module 112 has the closely spaced extension members 78A, 78B positioned toward the top of the housing 140 and the thicker extension member 78C toward the bottom of the housing 140. The link 74 on the opto-electrical module 110 has the thicker extension member 78C toward the top of the housing 114 and the two closely spaced extension members 78A, 78B toward the bottom of the housing 114. When the two housing 114, 140 are brought together, the thicker extension member 78C on the link 72 secured to the electrical module 112 extends in between the two closely spaced extension members 78A, 78B on the link 74 secured to the opto-electrical module 110. Likewise, the thicker extension member 78C on the link 74 secured to the opto-electrical module 110 extends in between the two closely extension members 78A, 78B on the link 72 secured to the electrical module 112. FIG. 7 is a perspective view of the opto-electrical module 110 and the electrical module 112 joined together as an opto-electronic module 108. The modules 110, 112 have been positioned to align the matched coplanar transmission structures 34 and 58. The extension members 78A, 78B, 78C of the links 72, 74 are overlapped and secured together with solder, an adhesive, such as epoxy or a low melting temperature metal with strong adhesion like indium 318. The amount of extension member overlap is preferably 040 inches. A single cover 320 is secured to the opto-electrical and electrical modules 110 and 112 to prevent foreign material from entering the opto-electrical module 108 and to prevent stray signals from interfering with the electrical signals of the opto-electronic module 108.

FIG. 8 shows a further embodiment for the links 72, 74 of the removable mechanical attachment members 70. Like elements from the previous drawing figures are labeled the same. Each link 72, 74 has a base 76 with front 306, back 308 and sides 310. The base 76 has two coaxially aligned bores 312, 314 formed therein with the first bore 312 extending into the base 76 from the front 306 and having a larger diameter than the second bore 314 that extends through the base 76 to the back 308. The larger sized bore 312 receives the head of the threaded cap screw 82 with the shank of the screw extends through the second bore 314. Two parallel recessed channels 320 are formed in the back 308 of the base 76 defining two ribs 322, 324 adjacent to two of opposing sides and a central platform 326 of equal height with the ribs 322, 324. Two axially aligned pedestal feet 316 are formed on the central platform 326 extending from the other opposing sides 310 toward the second bore 314 in the base. The pedestal feet 316 engage one of the horizontal channels 302 formed in the sidewalls 116, 118, 142, 144 of the housings 114, 140.

The closely spaced extension members 78A, 78B extending from one of the sides of the links 72,74 are replaced with a solid extension member 330 having tangs 332 extending in a perpendicular direction from the solid extension member 330 toward the front of the base. The thicker extension member 78C is still retained in the embodiment. When the two housing 114, 140 are brought together, the thicker extension member 78C on the link 72 secured to the electrical module 112 extends in between the two tangs on ths solid extension member on the link 74 secured to the opto-electrical module 110. Likewise, the thicker extension member 78C on the link 74 secured to the opto-electrical module 110 extends in between the two tangs on the solid extension member on the link 72 secured to the electrical module 112. The overlapping extension members 330 and 78C are secured together with solder or the like. The ribs and central platform prevent the total surface of the back 308 of the base 76 from touching the sidewalls 116, 118, 142, 144 of the housings 114, 140. This prevents the links 72, 74 from transferring excessive heat to the housing 114, 140 during the soldering of the extension members 330 and 78C.

Various embodiments of a removable mechanical attachment system have been described for joining electrical sections and housings of butt joined opto-electronic assemblies and modules together. The removable mechanical attachment system has linking elements secured to the side surfaces of electrical sections or housings. Each link has as base with a bore and at least a first extension member extending from a base. A threaded cap screw secured each of the links to the side surfaces of the electrical sections or housings. The extension members preferably extend past open end faces of the electrical sections and housings with the extension members overlapping each other as the electrical sections and housings are placed in a proximate abutting relationship at the open end faces. A bonding material is applied to the overlapping extension members to join the extension members together.

It will be obvious to those having skill in the art that many changes may be made to the details of the above-described embodiments of this invention without departing from the underlying principles thereof. The scope of the present invention should, therefore, be determined only by the following claims.

What is claimed is:

1. A removable mechanical attachment system for joining at least first and second electrical sections as a single electronic assembly with each of the first and second electrical sections having an open end face comprising:

first and second removable attachment members with each removable attachment member having first and second links with each link having a base, with the base having front, back and sides with a bore extending through the base from the front to the back and a least a first extension member extending from one of the sides of the base;

the first and second links of the first removable attachment member being secured to respective first surfaces of the first and second electrical sections and the first and second links of the second removable attachment member being secured to respective second surface of the first and second electrical sections by securing members with the first and second links of the first and second removable attachment members disposed adjacent to the open end faces of the first and second electrical sections with at least one of the extension members of the first and second links of each of the first and second removable attachment members extending past one of the open end faces of the first and second electrical sections;

the first and second electrical sections be positioned in a proximate abutting relationship at the open end faces with the extension members extending past the open end faces of the first and second electrical sections overlapping the other extension members of the first and second removable attachment members; and a bonding material applied to the overlapping extension members to join the extension members together.

2. The removable mechanical attachment system as recited in claim 1 wherein the first and second surfaces of the first and second electrical sections have threaded apertures formed therein and the securing members are threaded screws.

3. The removable mechanical attachment system as recited in claim 1 wherein the extension members of each of the first and second links of the first and second removable attachment members extend past the open end faces of the first and second electrical sections.

4. The removable mechanical attachment system as recited in claim 1 wherein each of the first and second links of the first and second removable attachment members further comprise a plurality of extension member extending from one of the side surfaces of the base with at least one of the plurality extension members of the first and second links of each of the first and second removable attachment members extending past one of the open end faces of the first and second electrical sections with the extension members extending past the open end faces of the first and second electrical sections overlapping the other extension members of the first and second removable attachment members.

5. The removable mechanical attachment system as recited in claim 4 wherein the plurality of extension members of each of the first and second links of the first and second removable attachment members extend past the open end faces of the first and second electrical sections.

6. The removable mechanical attachment system as recited in claim 1 wherein each of the first and second links of the first and second removable attachment members further comprise first and second extension members extending from one of the side surfaces of the base with the first extension member having tangs extending in a perpendicular direction from the extension member toward the front of the base with the first and second extension members of one of the first and second links of the first and second removable attachment members extending past the end faces of the first and second electrical sections with the second extension member of each of the first and second links of the first and second removable attachment members extending between the tines on the first extension member of each of the first and second links of the first and second removable attachment members.

7. The removable mechanical attachment system as recited in claim 6 wherein the first and second extension members of each of the first and second links of the first and second removable attachment members extend past the open end faces of the first and second electrical sections.

8. The removable mechanical attachment system as recited in claim 1 wherein the extension members are plated with a tin-lead alloy.

9. The removable mechanical attachment system as recited in claim 8 wherein bonding material is a solder.

10. The removable mechanical attachment system as recited in claim 1 wherein the bonding material is an adhesive.

11. The removable mechanical attachment system as recited in claim 10 wherein the adhesive is an epoxy.

12. The removable mechanical attachment system as recited in claim 11 wherein the epoxy is an ultraviolet cured epoxy.

13. The removable mechanical attachment system as recited in claim 1 wherein the bonding material is a strong adhesion low melting temperature metal.

14. A removable mechanical attachment system for joining at least first and second housings as a single electronic module with each of the first and second housings having an open end face comprising:

first and second removable attachment members with each removable attachment member having first and second links with each link having a base, with the base having front, back and sides with a bore extending through the base from the front to the back and a least a first extension member extending from one of the sides of the base;

the first and second links of the first removable attachment member being secured to respective first surfaces of the first and second housings and the first and second links of the second removable attachment member being secured to respective second surface of the first and second housings by securing members with the first and second links of the first and second removable attachment members disposed adjacent to the open end faces of the first and second housings with at least one of the extension members of the first and second links of each of the first and second removable attachment members extending past one of the open end faces of the first and second housings;

the first and second housings be positioned in a proximate abutting relationship at the open end faces with the extension members extending past the open end faces of the first and second housings overlapping the other extension members of the first and second removable attachment members; and a bonding material applied to the overlapping extension members to join the extension members together.

15. The removable mechanical attachment system as recited in claim 14 wherein the first and second surfaces of the first and second housing have threaded apertures formed therein and the securing members are threaded screws.

16. The removable mechanical attachment system as recited in claim 14 wherein each of the first and second links of the first and second removable attachment members further comprise at least a first pedestal foot formed on the back of the base that engages a channel formed in each of the first and second surfaces of the first and second housings.

17. The removable mechanical attachment system as recited in claim 14 wherein each of the first and second links of the first and second removable attachment members further comprise orthogonally disposed pedestal feet formed on the back of the base that engage orthogonally formed channels formed in each of the first and second surfaces of the first and second housings.

18. The removable mechanical attachment system as recited in claim 17 wherein the first and second surfaces of the first and second housing have threaded apertures formed at the intersection of the orthogonal channels and the securing members are threaded screws.

19. The removable mechanical attachment system as recited in claim 14 wherein the extension members of each of the first and second links of the first and second removable attachment members extend past the open end faces of the first and second housings.

20. The removable mechanical attachment system as recited in claim 14 wherein each of the first and second links of the first and second removable attachment members further comprise a plurality of extension member extending from one of the side surfaces of the base with at least one of the plurality extension members of the first and second links of each of the first and second removable attachment members extending past one of the open end faces of the first and second housings with the extension members extending past the open end faces of the first and second housings overlapping the other extension members of the first and second removable attachment members.

21. The removable mechanical attachment system as recited in claim 20 wherein the plurality of extension members of each of the first and second links of the first and second removable attachment members extend past the open end faces of the first and second housings.

22. The removable mechanical attachment system as recited in claim 14 wherein each of the first and second links of the first and second removable attachment members further comprise first and second extension members extending from one of the side surfaces of the base with the first extension member having tangs extending in a perpendicular direction from the extension member toward the front of the base with the first and second extension members of one of the first and second links of the first and second removable attachment members extending past the end faces of the first and second housings with the second extension member of each of the first and second links of the first and second removable attachment members extending between the tines on the first extension member of each of the first and second links of the first and second removable attachment members.

23. The removable mechanical attachment system as recited in claim 22 wherein the first and second extension members of each of the first and second links of the first and second removable attachment members extend past the open end faces of the first and second housings.

24. The removable mechanical attachment system as recited in claim 1 wherein the extension members are plated with a tin-lead alloy.

25. The removable mechanical attachment system as recited in claim 24 wherein bonding material is a solder.

26. The removable mechanical attachment system as recited in claim 1 wherein the bonding material is an adhesive.

27. The removable mechanical attachment system as recited in claim 26 wherein the adhesive is an epoxy.

28. The removable mechanical attachment system as recited in claim 27 wherein the epoxy is an ultraviolet cured epoxy.

29. The removable mechanical attachment system as recited in claim 14 wherein the bonding material is a strong adhesion low melting temperature metal.

* * * * *